US007009780B2

(12) United States Patent
Ishii

(10) Patent No.: US 7,009,780 B2
(45) Date of Patent: Mar. 7, 2006

(54) ZOOM LENS AND APPARATUS USING THE SAME

(75) Inventor: Atsujiro Ishii, Nishitokyo (JP)

(73) Assignee: Olympus Corporation, Tokyo (JP)

( * ) Notice: Subject to any disclaimer, the term of this patent is extended or adjusted under 35 U.S.C. 154(b) by 53 days.

(21) Appl. No.: 10/842,528

(22) Filed: May 11, 2004

(65) Prior Publication Data

US 2005/0041305 A1 Feb. 24, 2005

(30) Foreign Application Priority Data

May 13, 2003 (JP) ............................ 2003-134803

(51) Int. Cl.
*G02B 15/14* (2006.01)

(52) U.S. Cl. ...................... 359/688; 359/676; 359/740; 359/775; 359/683; 359/684; 359/685

(58) Field of Classification Search ................ 359/676, 359/683–685, 688, 715, 740, 775
See application file for complete search history.

(56) References Cited

U.S. PATENT DOCUMENTS

| | | | | |
|---|---|---|---|---|
| 5,144,488 A | | 9/1992 | Endo et al. | 359/686 |
| 5,737,128 A | * | 4/1998 | Usui | 359/686 |
| 5,898,525 A | * | 4/1999 | Suzuki | 359/684 |
| 6,002,528 A | * | 12/1999 | Tomita | 359/684 |
| 2002/0063970 A1 | * | 5/2002 | Uzawa et al. | 359/689 |

FOREIGN PATENT DOCUMENTS

| | | |
|---|---|---|
| JP | 03-289612 | 12/1991 |

* cited by examiner

*Primary Examiner*—Evelyn A. Lester

(74) *Attorney, Agent, or Firm*—Kenyon & Kenyon

(57) ABSTRACT

A zoom lens according to the present invention includes, in order from the object side, a first lens unit having a positive refractive power, a second lens unit having a negative refractive power, a third lens unit having a negative refractive power, and a fourth lens unit having a positive refractive power. During a magnification change from the wide-angle end through the telephoto end, the first lens unit and the fourth lens unit shift from the image-surface side toward the object side, a space between the first lens unit and the second lens unit increases, and spaces between individual lens units change. During a focusing from an object at the infinite distance onto an object at a near distance, the second lens unit and the third lens unit individually shift independently.

21 Claims, 9 Drawing Sheets

ZOOM LENS AND APPARATUS USING THE SAME

BACKGROUND OF THE INVENTION

1. Field of the Invention

The present invention relates to a zoom lens used in a silver-halide camera, a digital camera, a video camera or the like.

2. Description of the Related Art

Conventionally, in a zoom lens used in a silver-halide camera, a digital camera, a video camera or the like, it is known as a method for focusing from an object at the infinite distance to an object at a near distance to shift whole or a part of one unit out of lens units that change mutual spaces during a zooming operation (For example, refer to Japanese Patent Application Preliminary Publication (KOKAI) No. Hei 3-289612 or Japanese Patent Application Preliminary Publication (KOKAI) No. Hei 3-228008).

There is a type including four units having positive-negative-negative-positive power arrangement in order from the object side and performing focusing by shifting the positive first lens unit toward the object side, as in the method shown in KOKAI No. Hei 3-289612. Also, there is another type including three lens units having positive-negative-positive power arrangement in order from the object side and performing focusing by shifting forth the negative second lens unit toward the object side as in the method shown in KOKAI No. Hei 3-228008.

SUMMARY OF THE INVENTION

A zoom lens according to the present invention includes, in order from the object side, a first lens unit having a positive refractive power, a second lens unit having a negative refractive power, a third lens unit having a negative refractive power, and a fourth lens unit having a positive refractive power, wherein, during a magnification change from the wide-angle end through the telephoto end, the first lens unit and the fourth lens unit shift from the image-surface side toward the object side, a space between the first lens unit and the second lens unit increases, and spaces between individual lens units change, and wherein, during a focusing from an object at the infinite distance onto an object at a near distance, the second lens unit and the third lens unit individually shift independently.

Also, a zoom lens according to the present invention includes, in order from the object side, a first lens unit having a positive refractive power, a second lens unit having a negative refractive power, a third lens unit having a negative refractive power, and a fourth lens unit having a positive refractive power, wherein, during a magnification change from the wide-angle end through the telephoto end, the first lens unit and the fourth lens unit shift from the image-surface side toward the object side, a space between the first lens unit and the second lens unit increases, and spaces between the individual lens units change, wherein, during a focusing from an object at the infinite distance onto an object at a near distance, the second lens unit and the third lens unit individually shift independently, and wherein, for a focusing from an object at the infinite distance onto an object at any finite distance between the infinite distance and the proximate distance, amount of shift of the second lens unit and the third lens unit have predetermined values differing by zooming state.

Furthermore, a zoom lens according to the present invention includes, in order from the object side, a first lens unit having a positive refractive power, a second lens unit having a negative refractive power, a third lens unit having a negative refractive power, and a fourth lens unit having a positive refractive power, wherein, during a magnification change from the wide-angle end through the telephoto end, the first lens unit and the fourth lens unit shift from the image-surface side toward the object side, a space between the first lens unit and the second lens unit increases, and spaces between individual lens units change, wherein, during a focusing from an object at the infinite distance onto an object at a near distance, the second lens unit and the third lens unit individually shift independently, wherein, for a focusing from an object at the infinite distance onto an object at any finite distance between the infinite distance and the proximate distance, amount of shift of the second lens unit and the third lens unit have predetermined values differing by zooming state, and wherein the following condition is satisfied:

$$-2<X_{2W}/X_{3W}<0.5$$

where $X_{2W}$ is an amount of shift of the second lens unit and $X_{3W}$ is an amount of shift of the third lens unit for a focusing from the infinite distance to the proximate distance at the wide-angle end, upon a shift toward the image-surface side being given a positive value.

According to the present invention, it is possible to provide a zoom lens in which fluctuation of aberrations involved in focusing is stayed small and in which the proximate distance is designed sufficiently close without size increase of the lens system.

These features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
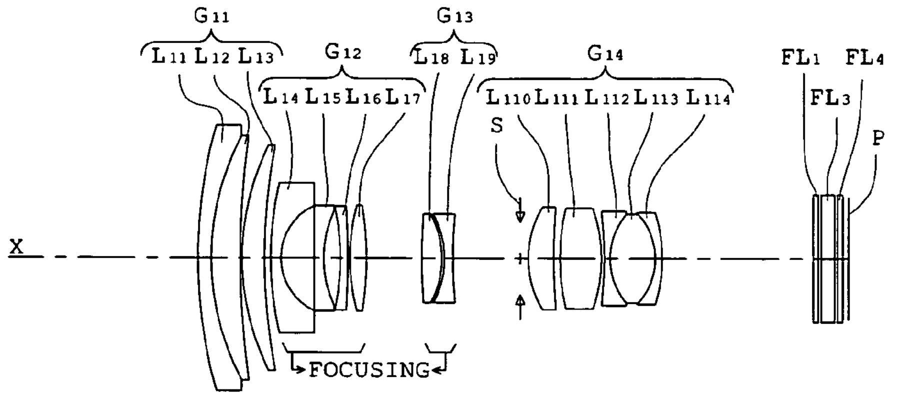
FIGS. 1A, 1B, and 1C are sectional views taken along the optical axis that show the optical configuration of the zoom lens of the first embodiment according to the present invention, showing the states at the wide-angle end, the intermediate position, and the telephoto end, respectively.

Preceding the explanation of the embodiments shown in the drawings, function and effect of the present invention are described below.

Regarding a zoom lens according to the present invention, it is possible to achieve small fluctuation of aberrations involved in focusing and to design the proximate distance to be sufficiently close without size increase of the lens system, by performing focusing by way of shifting each of the plurality of lens units in the zoom lens independently for an optimum amount in each zoom state. To be specific, in a zoom lens including a positive first lens unit, a negative second lens unit, a negative third lens unit, and a positive fourth lens unit with the first lens unit and the fourth lens unit shifting toward the object side and a space between the first lens unit and the second lens unit increasing during a magnification change from the wide-angle end through the telephoto end, configuration is made so that the second lens unit and the third lens unit individually shift independently during a focusing from an object at the infinite distance onto an object at a near distance.

If the focusing be made by shifting forth the second lens unit as stated above at the wide-angle end, it would be necessary, for the purpose of setting the proximate distance to be sufficiently close, to secure a wide space between the first lens unit and the second lens unit under the condition where the infinite distance is in focus. As a result, a lens diameter of the first lens unit would be rendered large. In addition, shift of the second lens unit would cause the problem of large fluctuation of astigmatism, distortion or the like. According to the present invention, the focusing is made by shifting forth mainly the third lens unit at the wide-angle end, to dispense with an extra space between the first lens unit and the second lens unit and to stay fluctuation of aberrations small. In addition, by shifting back the second lens unit toward the image-surface side by an amount smaller than the amount of shift of the third lens unit at the same time as the third lens unit is shifted forth toward the object side, fluctuation of aberrations involved in the shift of the third lens unit can cancel. Here, it is preferable to satisfy the following condition:

$$-2<X_{2w}/X_{3W}<0.5 \quad (1)$$

where $X_{2W}$ is an amount of shift of the second lens unit and $X_{3W}$ is an amount of shift of the third lens unit for the focusing at the wide-angle end, with a shift toward the image-surface side being given a positive value.

Condition (1) specifies a ratio of the amount of shift of the second lens unit to the amount of shift of the third lens unit for the focusing. If the upper limit of Condition (1) is exceeded, the amount of shift of the second lens unit toward the object side is large, to result in a large lens diameter of the first lens unit and increase in fluctuation of aberrations during the focusing, as stated above. If the lower limit of Condition (1) is not reached, the amount of shift back toward the image-surface side of the second lens unit is large, to result in increase in amount of shift of the third lens unit, for a shift of the imaging position caused by the shift of the second lens unit is in the opposite direction to the focusing.

Here, the case where $X_{2W}/X_{3W}=0$ is explained. Upon designing focusing to be performed by shifting the second lens unit and the third lens unit for respectively independent amount at any position other than the wide-angle end, the configuration can be made so that the second lens unit is not shifted in a focusing at the wide-angle end.

It is much preferable to satisfy the following condition (1'):

$$-1<X_{2W}/X_{3W}<0.3 \quad (1')$$

Furthermore, if the following condition (1") is satisfied, good focusing operation can be achieved over the full zooming range while precluding a large lens diameter of the first lens unit.

$$-0.8<X_{2W}/X_{3W}<-0.01 \quad (1")$$

Also, for a magnification change, a space between the first lens unit and the second lens unit should be sufficiently wide at the telephoto end. Thus, in order to achieve compact design of the length of the entire zoom lens, it is desirable that a space between the second lens unit and the third lens unit is small. In this case, it is desirable that the focusing is performed by shifting forth both of the second lens unit and the third lens unit. At the telephoto end, the space between the first lens unit and the second lens unit is large and the field angle is small. Thus, since fluctuation of aberrations involved in the shift of the second lens unit is small, the above-mentioned problem at the wide-angle end is not raised, and the proximate distance can be designed sufficiently small without degradation of performance.

In order to configure a system in which spaces for zooming are efficiently used and in which performance fluctuation caused by focusing is small, it is preferable that the second lens unit shifts toward the image side at the wide angle end and toward the object side at the telephoto end during a focusing from an object at the infinite distance onto an object at a finite distance.

In such an inner focus method, amount of shift of focusing lens unit(s) for a focusing onto a certain finite distance inevitably varies with zooming position, irrespective of whether a single lens unit or a plurality of lens units are used for focusing.

In a case where focusing is performed by a single lens unit, once the paraxial power arrangement of the entire system is determined, amount of shift of the focusing lens unit is uniquely determined by the object distance.

According to the present invention, in a case where focusing is performed by shifting a plurality of lens units independently, distribution ratio of amount of shift among the respective lens units may be arbitrarily selected. In this case, for realizing a smooth moving mechanism, it is desirable that, for a focusing from an object at the infinite distance onto an object at a certain finite distance, amount of shift of the second lens unit continuously changes as a zooming state changes from the wide-angle end through the telephoto end.

Also, it is desirable that, for a focusing from an object at the infinite distance onto an object at a certain finite distance, amount of shift of the third lens unit continuously changes as a zooming state changes from the wide-angle end through the telephoto end. In addition, if the configuration is made so that the third lens unit is shifted from the image side toward the object side during a focusing from an object at the infinite distance onto an object at a certain finite distance with its amount of shift increasing as a zooming state is changed from the wide-angle end through the telephoto end, a smooth moving mechanism can be much easily realized. In this configuration, effect of compensation for aberrations by shift of the second lens unit does not abruptly changes dependent on a zooming state, and thus a zoom lens in a good balance as a whole is achieved.

Also, upon expressing a shift of a focus lens by a function curve corresponding to f(Z)+g(L), which curve has a cam shape, where f(Z) and g(L) are cam rotation angle for zooming and cam rotation angle for focusing, respectively, upon taking zooming position Z and object distance L as parameters, it is desirable that distribution ratio of amount of shift for focusing between the respective lens units in each zooming position is set so that each of the second lens unit and the third lens unit can be expressed by an independent function curve corresponding to f(Z)+g(L).

Also, in a case where a focusing is performed by the second and third lens units in a zoom lens having positive-negative-negative-positive arrangement of refractive power with amount of shift of the second lens unit being small at the wide-angle end and increasing as a zooming state changes toward the telephoto side as set forth above, it is desirable that the cam curve of the second lens unit has an extreme value.

Also, it is much preferable to satisfy the following condition (2):

$$0.001<D_{12W}/D_{12T}<0.1 \quad (2)$$

where $D_{12W}$ is a space between the first lens unit and the second lens unit at the wide-angle end under the condition where the infinite distance is in focus, and $D_{12T}$ is a space between the first lens unit and the second lens unit at the telephoto end under the condition where the infinite distance is in focus.

If the lower limit of Condition (2) is not reached, the space between the first lens unit and the second lens unit at the wide-angle end is so small that frames of the lens units are likely to interfere. On the other hand, if the upper limit is exceeded, the space between the first lens unit and the second lens unit at the wide-angle end is wide, to render the lens diameter of the first lens unit large.

It is much preferable to satisfy the following condition (2'):

$$0.005<D_{12W}/D_{12T}<0.07 \quad (2')$$

It is still much preferable to satisfy the following condition (2"):

$$0.01<D_{12W}/D_{12T}<0.05 \quad (2'')$$

Also, it is preferable to satisfy the following condition (3)

$$3.0<D_{23w}/D_{23T}<20.0 \quad (3)$$

where $D_{23W}$ is a space between the second lens unit and the third lens unit at the wide-angle end under the condition where the infinite distance is in focus, and $D_{23T}$ is a space between the second lens unit and the third lens unit at the telephoto end under the condition where the infinite distance is in focus.

Condition (3) specifies a ratio of the space between the second lens unit and the third lens unit at the wide-angle end to the space between the second lens unit and the third lens unit at the telephoto end. If the lower limit of Condition (3) is not reached, variation of the space between the second lens unit and the third lens unit in zooming is small, to less contribute to compensation, by change of the space between the second lens unit and the third lens unit, for fluctuation of aberrations. On the other hand, if the upper limit is exceeded, the space between the second lens unit and the third lens unit at the wide-angle end is large, to less contribute to compact design of the entire length at the wide-angle end.

It is much preferable to satisfy the following condition (3'):

$$4.0<D_{23W}/D_{23T}<10.0 \quad (3')$$

It is still much preferable to satisfy the following condition (3"):

$$5.0<D_{23w}/D_{23T}<7.0 \quad (3'')$$

Also, it is preferable to satisfy the following condition (4):

$$0.7<X_{2T}/X_{3T}<1.5 \quad (4)$$

where $X_{2T}$ is an amount of shift of the second lens unit for a focusing from the infinite distance onto the proximate distance at the telephoto end, and $X_{3T}$ is an amount of shift of the third lens unit for the focusing from the infinite distance onto the proximate distance at the telephoto end.

Condition (4) specifies a ratio of the amount of shift of the second lens unit to the amount of shift of the third lens unit for the focusing at the telephoto end. If the lower limit of Condition (4) is not reached, the amount of shift of the second lens unit in the focusing is small, and thus the second lens unit and the third lens unit are likely to interfere, to make it difficult to shorten the proximate distance. On the other hand, if the upper limited is exceeded, the amount of shift of the third lens unit in the focusing becomes small, and thus contribution of the third lens unit to the focusing is reduced.

It is much preferable to satisfy the following condition (4'):

$$0.8<X_{2T}/X_{3T}<1.3 \quad (4')$$

It is still much preferable to satisfy the following condition (4");

$$0.9<X_{2T}/X_{3T}<1.1 \quad (4')$$

In each of the examples above, the upper limit value alone or the lower limit value alone may be specified. Also, a plurality of the conditional expressions may be satisfied simultaneously.

In reference to the drawings and numerical data, the embodiments of the zoom lens according to the present invention are described below.

First Embodiment

Figure 1B:
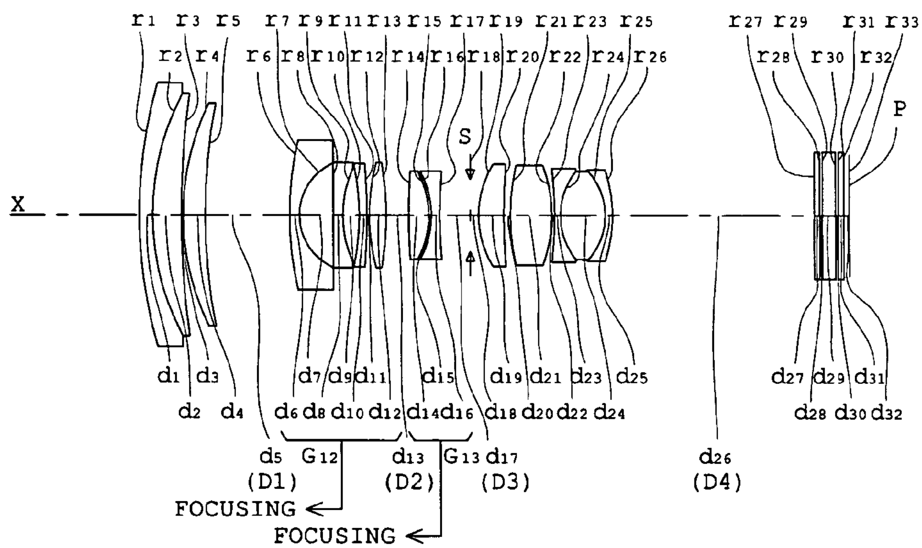
Figure 1C:
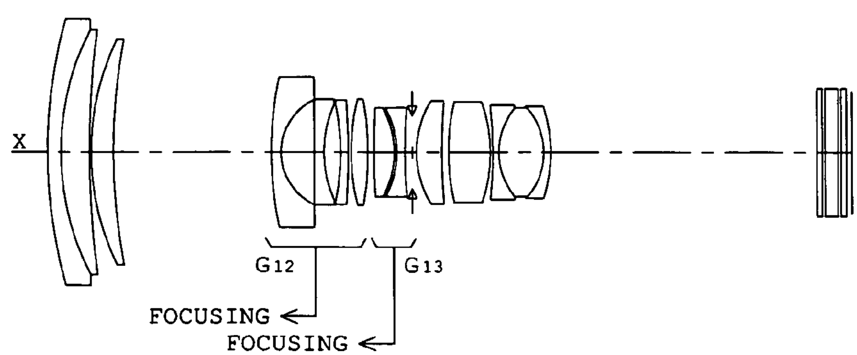

FIGS. 1A, 1B, and 1C are sectional views taken along the optical axis that show the optical configuration of the zoom lens of the first embodiment according to the present invention, showing the states at the wide-angle end, the intermediate position, and the telephoto end, respectively. FIGS. 5A–5D, 5E–5H, and 5I–5L are diagrams that show spherical aberration, astigmatism, distortion, and chromatic aberration of magnification of the first embodiment at the wide-angle end, the intermediate position, and the telephoto end, respectively.

As shown in FIG. 1, the zoom lens of the first embodiment includes, in order from the object side X toward an image-pickup element surface P, a first lens unit $G_{11}$ having a positive refractive power, a second lens unit $G_{12}$ having a negative refractive power, a third lens unit $G_{13}$ having a negative refractive power, and a fourth lens unit $G_{14}$ having a positive refractive power. During a magnification change from the wide-angle end (FIG. 1A) through the telephoto end (FIG. 1C), the first lens unit $G_{11}$ and the fourth lens unit $G_{14}$ are shifted from the image-surface side toward the object side. In this event, a space $D_1$ between the first lens unit $G_{11}$ and the second lens unit $G_{12}$ increases, and spaces between individual lens units change. During a focusing from an object at the infinite distance onto an object at a near distance, the second lens unit $G_{12}$ and the third lens unit $G_{13}$ individually shift independently. In FIG. 1, the reference symbol S denotes a stop, the reference symbol $FL_1$ denotes an infrared absorption filter, the reference symbol $FL_3$ denotes a lowpass filter, and the reference symbol $FL_4$ denotes a cover glass of a CCD or CMOS sensor. The reference symbol P denotes an image pickup surface, which is disposed in the effective image-pickup diagonal direction of the CCD or CMOS sensor.

The first lens unit $G_{11}$ is composed of, in order from the object side X, a negative first lens $L_{11}$, a positive second lens $L_{12}$, and a positive third lens $L_{13}$. The first lens $L_{11}$ and the second lens $L_{12}$ form a cemented lens.

The second lens unit $G_{12}$ is composed of, in order from the object side X, a negative fourth lens $L_{14}$, a negative fifth lens $L_{15}$ with its image-side concave surface being aspherical, a negative sixth lens $L_{16}$, and a positive seventh lens $L_{17}$.

The third lens unit $G_{13}$ is composed of, in order from the object side X, a positive eighth lens $L_{18}$, and a negative ninth lens $L_{19}$ with its object-side concave surface being aspherical.

The fourth lens unit $G_{14}$ is composed of, in order from the object side X, a positive tenth lens $L_{110}$ with its image-side concave surface being aspherical, a positive eleventh lens $L_{111}$, a negative twelfth lens $L_{112}$, a positive thirteenth lens $L_{113}$, and a negative fourteenth lens $L_{114}$. Of these lenses, the twelfth lens, the thirteenth lens, and the fourteenth lens form a cemented lens.

The stop S is arranged between the third lens unit $G_{13}$ and the fourth lens unit $G_{14}$. The infrared absorption filter $FL_1$, the lowpass filter $FL_2$, and the cover glass $FL_3$ of the CCD or CMOS sensor are arranged on the image side of the fourth lens unit $G_{14}$ in this order toward the image pickup surface P.

The numerical data of the optical members constituting the zoom lens according to the first embodiment are shown below.

In the numerical data of the first embodiment, $r_1$, $r_2$, . . . denote radii of curvature of the respective lens surfaces, $d_1$, $d_2$, . . . denote thicknesses of or airspaces between the respective lenses, $n_{d1}$, $n_{d2}$, . . . are refractive indices of the respective lenses or airspaces ford-line rays, $V_{d1}$, $v_{d2}$, . . . are Abbe's numbers of the respective lenses, Fno. denotes F-number, and f denotes a focal length of the entire system. Values of r, d, and f are in millimeters.

It is noted that an aspherical surface is expressed by the following equation:

$$z=(y^2/r)/[1+\{1-(1+K)(y/r)^2\}^{1/2}]+A_4y^4+A_6y^6+A_8y^8+A_{10}y^{10}$$

where z is taken along the direction of the optical axis, y is taken along a direction intersecting the optical axis at right angles, a conical coefficient is denoted by K, and aspherical coefficients are denoted by $A_4$, $A_6$, $A_8$, and $A_{10}$.

These reference symbols are commonly used in the numerical data of the subsequent embodiments also.

Numerical data 1 focal length f = 14.69~53.88 mm, Fno. = 2.85~3.55
2ω = 74.36°~23.36°

| | | |
|---|---|---|
| $r_1$ = 92.1912 | | |
| $d_1$ = 2.5 | $n_{d1}$ = 1.84666 | $\nu_{d1}$ = 23.78 |
| $r_2$ = 50.9961 | | |
| $d_2$ = 5.84 | $n_{d2}$ = 1.6516 | $\nu_{d2}$ = 58.55 |
| $r_3$ = 193.066 | | |
| $d_3$ = 0.13 | $n_{d3}$ = 1 | |
| $r_4$ = 47.0946 | | |
| $d_4$ = 4.36 | $n_{d4}$ = 1.7725 | $\nu_{d4}$ = 49.6 |
| $r_5$ = 104.1756 | | |
| $d_5$ = $D_1$ | $n_{d5}$ = 1 | |
| $r_6$ = 63.4707 | | |
| $d_6$ = 1.89 | $n_{d6}$ = 1.7725 | $\nu_{d6}$ = 49.6 |
| $r_7$ = 11.2012 | | |
| $d_7$ = 6.64 | $n_{d7}$ = 1 | |
| $r_8$ = 311.5503 | | |
| $d_8$ = 1.8 | $n_{d8}$ = 1.58313 | $\nu_{d8}$ = 59.38 |
| $r_9$ = 17.622 | | |
| $d_9$ = 3.22 | $n_{d9}$ = 1 | |
| $r_{10}$ = −49.2708 | | |
| $d_{10}$ = 1.5 | $n_{d10}$ = 1.57281 | $\nu_{d10}$ = 65.72 |
| $r_{11}$ = −135.9067 | | |
| $d_{11}$ = 0.17 | $n_{d11}$ = 1 | |
| $r_{12}$ = 39.3696 | | |
| $d_{12}$ = 3.3 | $n_{d12}$ = 1.84666 | $\nu_{d12}$ = 23.78 |
| $r_{13}$ = −59.013 | | |
| $d_{13}$ = $D_2$ | $n_{d13}$ = 1 | |
| $r_{14}$ = 92.5004 | | |
| $d_{14}$ = 3.94 | $n_{d14}$ = 1.53609 | $\nu_{d14}$ = 60.92 |
| $r_{15}$ = −18.2971 | | |
| $d_{15}$ = 0.2 | $n_{d15}$ = 1 | |
| $r_{16}$ = −17.4747 | | |
| $d_{16}$ = 1.8 | $n_{d16}$ = 1.8061 | $\nu_{d16}$ = 40.92 |
| $r_{17}$ = 116.0971 | | |
| $d_{17}$ = $D_3$ | $n_{d17}$ = 1 | |
| $r_{18}$ = ∞ (aperture stop) | | |
| $d_{18}$ = 1.5 | $n_{d18}$ = 1 | |
| $r_{19}$ = 19.9443 | | |
| $d_{19}$ = 4.98 | $n_{d19}$ = 1.51633 | $\nu_{d19}$ = 64.14 |
| $r_{20}$ = −154.1774 | | |
| $d_{20}$ = 1.1 | $n_{d20}$ = 1 | |
| $r_{21}$ = 44.2951 | | |
| $d_{21}$ = 8.4 | $n_{d21}$ = 1.497 | $\nu_{d21}$ = 81.54 |
| $r_{22}$ = −24.6953 | | |
| $d_{22}$ = 0.19 | $n_{d22}$ = 1 | |
| $r_{23}$ = −99.5386 | | |
| $d_{23}$ = 1.3 | $n_{d23}$ = 1.7725 | $\nu_{d23}$ = 49.6 |
| $r_{24}$ = 13.692 | | |
| $d_{24}$ = 8.82 | $n_{d24}$ = 1.48749 | $\nu_{d24}$ = 70.23 |
| $r_{25}$ = −12.0725 | | |
| $d_{25}$ = 1.3 | $n_{d25}$ = 1.62684 | $\nu_{d25}$ = 40.98 |
| $r_{26}$ = −23.8764 | | |
| $d_{26}$ = $D_4$ | $n_{d26}$ = 1 | |
| $r_{27}$ = ∞ | | |
| $d_{27}$ = 0.8 | $n_{d27}$ = 1.51633 | $\nu_{d27}$ = 64.14 |
| $r_{28}$ = ∞ | | |
| $d_{28}$ = 0.8 | $n_{d28}$ = 1 | |
| $r_{29}$ = ∞ | | |
| $d_{29}$ = 2.8 | $n_{d29}$ = 1.54771 | $\nu_{d29}$ = 62.84 |
| $r_{30}$ = ∞ | | |
| $d_{30}$ = 0.5 | $n_{d30}$ = 1 | |
| $r_{31}$ = ∞ | | |
| $d_{31}$ = 0.87 | $n_{d31}$ = 1.5231 | $\nu_{d31}$ = 54.49 |
| $r_{32}$ = ∞ | | |
| $d_{32}$ = 1.07 | $n_{d32}$ = 1 | |
| IMG = ∞ (image pickup surface) | | |

aspherical coefficients

| | | |
|---|---|---|
| | 9th surface | |
| K = 0 | | |
| $A_2 = 0$ | $A_4 = -5.1635 \times 10^{-5}$ | $A_6 = -1.7186 \times 10^{-7}$ |
| $A_8 = -2.5602 \times 10^{-9}$ | $A_{10} = 3.2674 \times 10^{-11}$ | $A_{12} = -2.1983 \times 10^{-13}$ |
| | 16th surface | |
| K = 0 | | |
| $A_2 = 0$ | $A_4 = 1.3943 \times 10^{-5}$ | $A_6 = 4.9740 \times 10^{-8}$ |
| $A_8 = 1.0865 \times 10^{-9}$ | $A_{10} = 6.4354 \times 10^{-12}$ | |
| | 20th surface | |
| K = 0 | | |
| $A_2 = 0$ | $A_4 = 4.9366 \times 10^{-5}$ | $A_6 = 3.3833 \times 10^{-8}$ |
| $A_8 = 4.6617 \times 10^{-10}$ | $A_{10} = -6.8786 \times 10^{-12}$ | $A_{12} = 3.4557 \times 10^{-14}$ |

(variable space in focusing)

| | f = 14.67 | f = 28.1 | f = 53.88 |
|---|---|---|---|
| IO = ∞ (object distance (mm)) | | | |
| zooming space $D_1$ | 1 | 16.21 | 30.51 |
| $D_2$ | 11.1 | 4.41 | 1.15 |
| $D_3$ | 12.62 | 6.11 | 1 |
| $D_4$ | 29.15 | 38.87 | 50.72 |
| IO = 220 (object distance (mm)) | | | |
| zooming space $D_1$ | 3.13 | 15.54 | 26.13 |
| $D_2$ | 5.92 | 1.41 | 0.99 |
| $D_3$ | 15.67 | 9.78 | 5.54 |
| $D_4$ | 29.15 | 38.87 | 50.72 |

Second Embodiment

Figure 2A:
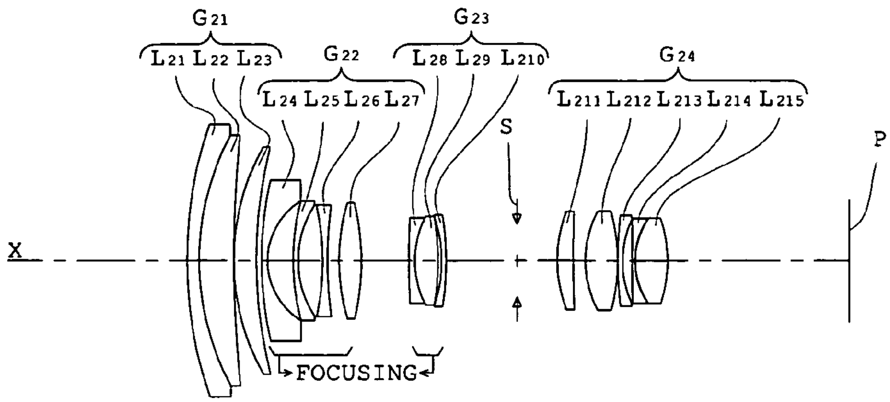
FIGS. 2A, 2B and 2C are sectional views taken along the optical axis that show the optical configuration of the zoom lens of the second embodiment according to the present invention, showing the states at the wide-angle end, the intermediate position, and the telephoto end, respectively.
Figure 2B:
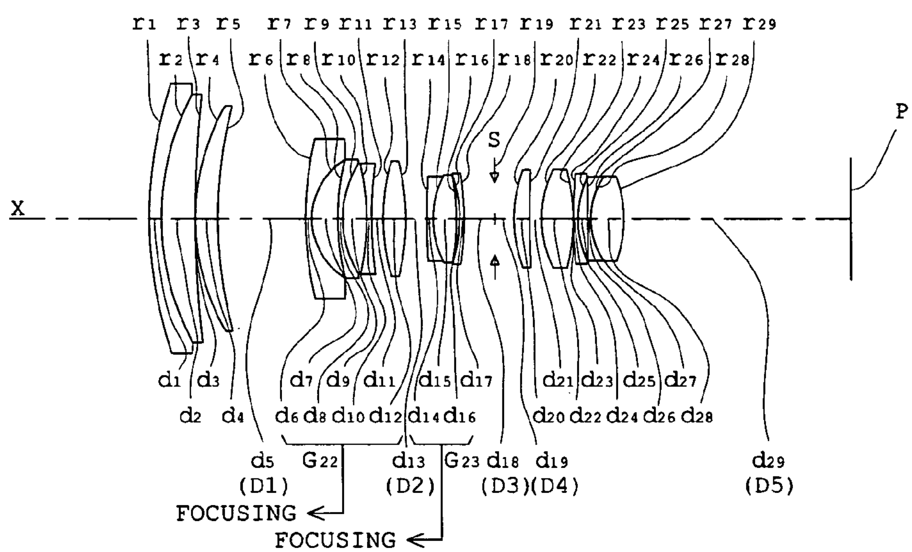
Figure 2C:
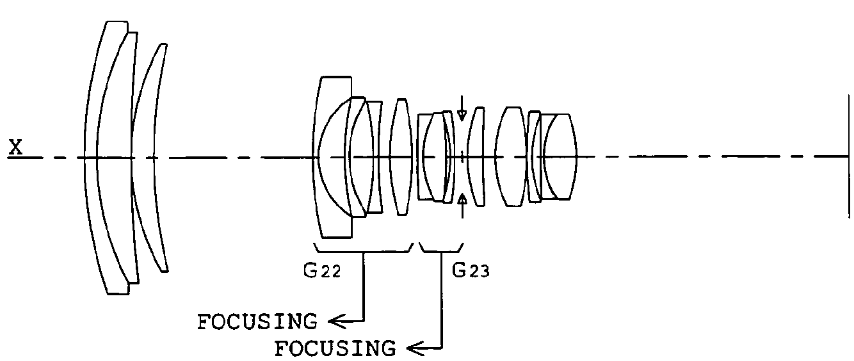

FIGS. 2A, 2B, and 2C are sectional views taken along the optical axis that show the optical configuration of the zoom lens of the second embodiment according to the present invention, showing the states at the wide-angle end, the intermediate position, and the telephoto end, respectively. FIGS. 6A–6D, 6E–6H, and 6I–6L are diagrams that show spherical aberration, astigmatism, distortion, and chromatic aberration of magnification of the second embodiment at the wide-angle end, the intermediate position, and the telephoto end, respectively.

As shown in FIG. 2, the zoom lens of the second embodiment includes, in order from the object side X toward an image-pickup element surface P, a first lens unit $G_{21}$ having a positive refractive power, a second lens unit $G_{22}$ having a negative refractive power, a third lens unit $G_{23}$ having a negative refractive power, and a fourth lens unit $G_{24}$ having a positive refractive power. During a magnification change from the wide-angle end (FIG. 2A) through the telephoto end (FIG. 2C), the first lens unit $G_{21}$ and the fourth lens unit $G_{24}$ are shifted from the image-surface side toward the object side. In this event, a space $D_1$ between the first lens unit $G_{21}$ and the second lens unit $G_{22}$ increases, and spaces $D_2$, $D_3$, and $D_4$ between individual lens units change. During a focusing from an object at the infinite distance onto an object at a near distance, the second lens unit $G_{22}$ and the third lens unit $G_{23}$ individually shift independently. In FIG. 2, the reference symbol S denotes a stop. The reference symbol P denotes an image pickup surface, which is disposed in the effective image-pickup diagonal direction of a CCD or CMOS sensor.

The first lens unit $G_{21}$ is composed of, in order from the object side X, a negative first lens $L_{21}$, a positive second lens $L_{22}$, and a positive third lens $L_{23}$. The first lens $L_{21}$ and the second lens $L_{22}$ form a cemented lens.

The second lens unit $G_{22}$ is composed of, in order from the object side X, a negative fourth lens $L_{24}$, a negative fifth lens $L_{25}$ with its image-side concave surface being aspherical, a negative sixth lens $L_{26}$, and a positive seventh lens $L_{27}$.

The third lens unit $G_{23}$ is composed of, in order from the object side X, a negative eighth lens $L_{28}$, a positive ninth lens $L_{29}$ with its image-side convex surface being aspherical, and a negative tenth lens $L_{210}$. The eighth lens $L_{28}$ and the ninth lens $L_{29}$ form a cemented lens.

The fourth lens unit $G_{24}$ is composed of, in order from the object side X, a positive eleventh lens $L_{211}$ with its image-side concave surface being aspherical, a negative twelfth lens $L_{212}$, a negative thirteenth lens $L_{213}$, a negative fourteenth lens $L_{214}$, and a positive fifteenth lens $L_{215}$. Each lens of the fourth lens unit $G_{24}$ is constructed as a singlet lens. The stop S is arranged between the third lens unit $G_{23}$ and the fourth lens unit $G_{24}$. The image pickup surface P is arranged on the image side of the fourth lens unit $G_{24}$.

This embodiment specifies a zoom lens having focal length of 14.7153.88 mm, F-number of 2.853.75, and 2ω=74.58°23.49°.

| Numerical data 2 | | |
|---|---|---|
| focal length f = 14.71~53.88 mm, Fno. = 2.85~3.57 | | |
| 2ω = 74.58°~23.49° | | |
| $r_1 = 84.456$ | | |
| $d_1 = 2.27$ | $n_{d1} = 1.84666$ | $\nu_{d1} = 23.78$ |
| $r_2 = 51.995$ | | |
| $d_2 = 6.73$ | $n_{d2} = 1.6968$ | $\nu_{d2} = 55.53$ |
| $r_3 = 229.3$ | | |
| $d_3 = 0.13$ | $n_{d3} = 1$ | |
| $r_4 = 45.1147$ | | |
| $d_4 = 4.16$ | $n_{d4} = 1.69213$ | $\nu_{d4} = 55.37$ |
| $r_5 = 82.4423$ | | |
| $d_5 = D_1$ | $n_{d5} = 1$ | |
| $r_6 = 70.9504$ | | |
| $d_6 = 1.18$ | $n_{d6} = 1.804$ | $\nu_{d6} = 46.57$ |
| $r_7 = 13.2517$ | | |
| $d_7 = 5.02$ | $n_{d7} = 1$ | |
| $r_8 = 48.8445$ | | |
| $d_8 = 0.99$ | $n_{d8} = 1.65313$ | $\nu_{d8} = 58.37$ |
| $r_9 = 18.6211$ | | |
| $d_9 = 4.42$ | $n_{d9} = 1$ | |
| $r_{10} = -50.977$ | | |
| $d_{10} = 1$ | $n_{d10} = 1.61017$ | $\nu_{d10} = 61.49$ |
| $r_{11} = 67.7526$ | | |
| $d_{11} = 2.44$ | $n_{d11} = 1$ | |
| $r_{12} = 41.3578$ | | |
| $d_{12} = 4.2$ | $n_{d12} = 1.84666$ | $\nu_{d12} = 23.78$ |
| $r_{13} = -49.5698$ | | |
| $d_{13} = D_2$ | $n_{d13} = 1$ | |
| $r_{14} = 429.3566$ | | |
| $d_{14} = 1$ | $n_{d14} = 1.79802$ | $\nu_{d14} = 38.51$ |
| $r_{15} = 18.4994$ | | |
| $d_{15} = 4.77$ | $n_{d15} = 1.51633$ | $\nu_{d15} = 64.14$ |
| $r_{16} = -31.5464$ | | |
| $d_{16} = 0.31$ | $n_{d16} = 1$ | |
| $r_{17} = -24.6047$ | | |
| $d_{17} = 1$ | $n_{d17} = 1.7994$ | $\nu_{d17} = 45.15$ |
| $r_{18} = -52.1062$ | | |
| $d_{18} = D_3$ | $n_{d18} = 1$ | |
| $r_{19}$ = (S: stop) | | |
| $d_{19} = D_4$ | $n_{d19} = 1$ | |
| $r_{20} = 30.2789$ | | |
| $d_{20} = 3.11$ | $n_{d20} = 1.56602$ | $\nu_{d20} = 56$ |
| $r_{21} = -139.0487$ | | |
| $d_{21} = 2.25$ | $n_{d21} = 1$ | |
| $r_{22} = 19.4216$ | | |
| $d_{22} = 6.25$ | $n_{d22} = 1.497$ | $\nu_{d22} = 81.54$ |
| $r_{23} = -32.3709$ | | |
| $d_{23} = 0$ | $n_{d23} = 1$ | |

-continued

| Numerical data 2 | | |
|---|---|---|
| $r_{24} = 94.8037$ | | |
| $d_{24} = 1$ | $n_{d24} = 1.80123$ | $\nu_{d24} = 44.49$ |
| $r_{25} = 19.8715$ | | |
| $d_{25} = 1.46$ | $n_{d25} = 1$ | |
| $r_{26} = 119.9151$ | | |
| $d_{26} = 0.94$ | $n_{d26} = 1.80547$ | $\nu_{d26} = 43.54$ |
| $r_{27} = 13.8717$ | | |
| $d_{27} = 0.02$ | $n_{d27} = 1$ | |
| $r_{28} = 13.9681$ | | |
| $d_{28} = 6.34$ | $n_{d28} = 1.48749$ | $\nu_{d28} = 70.23$ |
| $r_{29} = -24.2991$ | | |
| $d_{29} = D_5$ | $n_{d29} = 1$ | |
| IMG = ∞ | | |

aspherical coefficients

| | | |
|---|---|---|
| | 9th surface | |
| $K = 0$ | | |
| $A_2 = 0$ | $A_4 = -1.2201 \times 10^{-5}$ | $A_6 = -8.3210 \times 10^{-8}$ |
| $A_8 = 2.9877E \times 10^{-10}$ | $A_{10} = -3.5791 \times 10^{-12}$ | |
| | 16th surface | |
| $K = 0$ | | |
| $A_2 = 0$ | $A_4 = -1.9830 \times 10^{-5}$ | $A_6 = -7.8377 \times 10^{-8}$ |
| $A_8 = 1.0328 \times 10^{-9}$ | $A_{10} = -1.0396 \times 10^{-11}$ | |
| | 21st surface | |
| $K = 0$ | | |
| $A_2 = 0$ | $A_4 = 3.8514 \times 10^{-5}$ | $A_6 = 6.4175 \times 10^{-8}$ |
| $A_8 = -2.1234 \times 10^{-10}$ | $A_{10} = 3.8743E \times 10^{-12}$ | |

(variable space in focusing)

| | f = 14.71 | f = 29 | f = 53.88 |
|---|---|---|---|
| | IO = ∞ (object distance (mm)) | | |
| zooming space $D_1$ | 1 | 16.37 | 30.52 |
| $D_2$ | 9.29 | 4.37 | 1.32 |
| $D_3$ | 13.58 | 6.18 | 1.08 |
| $D_4$ | 7.82 | 3.25 | 1 |
| $D_5$ | 34.68 | 43.69 | 52.01 |
| | IO = 220 (object distance (mm)) | | |
| zooming space $D_1$ | 1.1 | 13.81 | 23.28 |
| $D_2$ | 4.77 | 1.21 | 0.99 |
| $D_3$ | 18 | 11.89 | 8.65 |
| $D_4$ | 7.82 | 3.25 | 1 |
| $D_5$ | 34.68 | 43.69 | 52.01 |

Third Embodiment

Figure 3A:
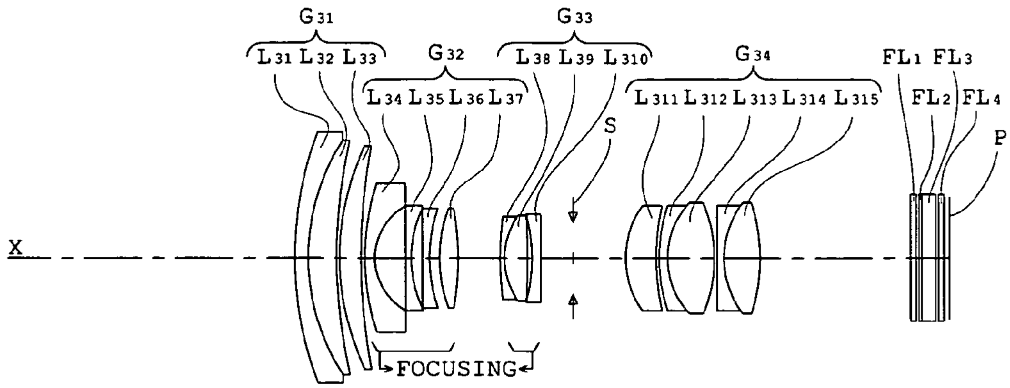
FIGS. 3A, 3B and 3C are sectional views taken along the optical axis that show the optical configuration of the zoom lens of the third embodiment according to the present invention, showing the states at the wide-angle end, the intermediate position, and the telephoto end, respectively.
Figure 3B:
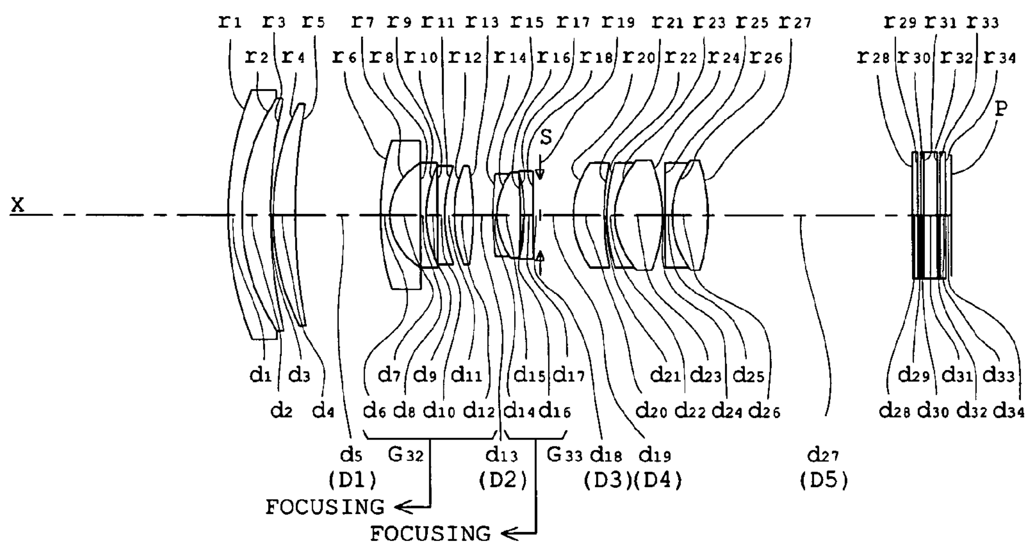
Figure 3C:
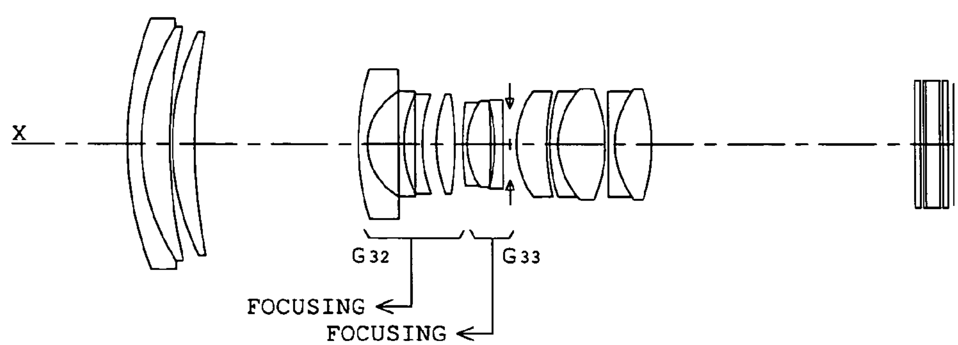

FIGS. 3A, 3B, and 3C are sectional views taken along the optical axis that show the optical configuration of the zoom lens of the third embodiment according to the present invention, showing the states at the wide-angle end, the intermediate position, and the telephoto end, respectively. FIGS. 7A–7D, 7E–7H, and 7I–7L are diagrams that show spherical aberration, astigmatism, distortion, and chromatic aberration of magnification of the third embodiment at the wide-angle end, the intermediate position, and the telephoto end, respectively.

As shown in FIG. 3, the zoom lens of the third embodiment includes, in order from the object side X toward an image-pickup element surface P, a first lens unit $G_{31}$ having a positive refractive power, a second lens unit $G_{32}$ having a negative refractive power, a third lens unit $G_{33}$ having a negative refractive power, and a fourth lens unit $G_{34}$ having a positive refractive power. During a magnification change from the wide-angle end (FIG. 3A) through the telephoto end (FIG. 3C), the first lens unit $G_{31}$ and the fourth lens unit $G_{34}$ are shifted from the image-surface side toward the object side. In this event, a space $D_1$ between the first lens unit $G_{31}$ and the second lens unit $G_{32}$ increases, and spaces $D_2$, $D_3$, $D_4$, and $D_5$ between individual lens units change. During a focusing from an object at the infinite distance onto an object at a near distance, the second lens unit $G_{32}$ and the third lens unit $G_{33}$ individually shift independently. In FIG. 3, the reference symbol S denotes a stop, the reference symbol $FL_1$ denotes an infrared absorption filter, the reference symbol $FL_2$ denotes a filter (for instance, an ultraviolet absorption filter), the reference symbol $FL_3$ denotes a lowpass filter, and the reference symbol $FL_4$ denotes a cover glass of a CCD or CMOS sensor. The reference symbol P denotes an image pickup surface, which is disposed in the effective image-pickup diagonal direction of the CCD or CMOS sensor.

The first lens unit $G_{31}$ is composed of, in order from the object side X, a negative first lens $L_{31}$, a positive second lens $L_{32}$, and a positive third lens $L_{33}$. The first lens $L_{31}$ and the second lens $L_{32}$ form a cemented lens.

The second lens unit $G_{32}$ is composed of, in order from the object side X, a negative fourth lens $L_{34}$, a negative fifth lens $L_{35}$, a negative sixth lens $L_{36}$ with its image-side concave surface being aspherical, and a positive seventh lens $L_{37}$.

The third lens unit $G_{33}$ is composed of, in order from the object side X, a negative eighth lens $L_{38}$, a positive ninth lens $L_{39}$, and a negative tenth lens $L_{310}$ with its object-side concave surface being aspherical. The eighth lens $L_{38}$ and the ninth lens $L_{39}$ form a cemented lens.

The fourth lens unit $G_{34}$ is composed of, in order from the object side X, a positive eleventh lens $L_{311}$ with its image-side concave surface being aspherical, a negative twelfth lens $L_{312}$, a positive thirteenth lens $L_{313}$, a negative fourteenth lens $L_{314}$, and a positive fifteenth lens $L_{315}$. Of these lenses of the fourth lens unit, each pair of the twelfth lens $L_{312}$ and the thirteenth lens $L_{313}$, and the fourteenth lens $L_{314}$ and the fifteenth lens $L_{315}$ form a cemented lens. The stop S is arranged between the third lens unit $G_{33}$ and the fourth lens unit $G_{34}$. The infrared absorption filter $FL_1$, the filter $FL_2$, and the lowpass filter $FL_3$ are arranged behind the fourth lens unit $G_{34}$. In addition, the cover glass $FL_4$ is arranged on the image pickup surface P formed of a CCD or CMOS sensor.

This embodiment specifies a zoom lens having focal length of 14.6953.09 mm, F-number of 2.853.57, and 2ω=74.34°23.7°.

| Numerical data 3 | | |
|---|---|---|
| focal length f = 14.69~53.09 mm, Fno. = 2.85~3.57 | | |
| 2ω = 74.34°~23.7° | | |
| $r_1 = 72.4777$ | | |
| $d_1 = 2.5$ | $n_{d1} = 1.78472$ | $\nu_{d1} = 25.68$ |
| $r_2 = 43.7011$ | | |
| $d_2 = 5.84$ | $n_{d2} = 1.60311$ | $\nu_{d2} = 60.64$ |
| $r_3 = 120.2886$ | | |
| $d_3 = 0.15$ | $n_{d3} = 1$ | |
| $r_4 = 50.8706$ | | |
| $d_4 = 4.15$ | $n_{d4} = 1.7725$ | $\nu_{d4} = 49.6$ |

-continued

| Numerical data 3 | | |
|---|---|---|
| $r_5 = 116.5737$ | | |
| $d_5 = D_1$ | $n_{d5} = 1$ | |
| $r_6 = 48.0592$ | | |
| $d_6 = 1.79$ | $n_{d6} = 1.7725$ | $\nu_{d6} = 49.6$ |
| $r_7 = 11.9943$ | | |
| $d_7 = 5.96$ | $n_{d7} = 1$ | |
| $r_8 = 402.0321$ | | |
| $d_8 = 1.30$ | $n_{d8} = 1.72916$ | $\nu_{d8} = 54.68$ |
| $r_9 = 22.3938$ | | |
| $d_9 = 2.08$ | $n_{d9} = 1$ | |
| $r_{10} = 499.9999$ | | |
| $d_{10} = 1.5$ | $n_{d10} = 1.58213$ | $\nu_{d10} = 59.38$ |
| $r_{11} = 31.4025$ | | |
| $d_{11} = 1.87$ | $n_{d11} = 1$ | |
| $r_{12} = 32.5882$ | | |
| $d_{12} = 3.64$ | $n_{d12} = 1.84666$ | $\nu_{d12} = 23.78$ |
| $r_{13} = -56.5538$ | | |
| $d_{13} = D_2$ | $n_{d13} = 1$ | |
| $r_{14} = 97.862$ | | |
| $d_{14} = 1$ | $n_{d14} = 1.68893$ | $\nu_{d14} = 31.07$ |
| $r_{15} = 14.9639$ | | |
| $d_{15} = 4.48$ | $n_{d15} = 1.51742$ | $\nu_{d15} = 52.43$ |
| $r_{16} = -77.7981$ | | |
| $d_{16} = 0.71$ | $n_{d16} = 1$ | |
| $r_{17} = -27.5251$ | | |
| $d_{17} = 1.4$ | $n_{d17} = 1.58213$ | $\nu_{d17} = 59.38$ |
| $r_{18} = -499.9997$ | | |
| $d_{18} = D_3$ | $n_{d18} = 1$ | |
| $r_{19}$ = (aperture stop) | | |
| $d_{19} = D_4$ | $n_{d19} = 1$ | |
| $r_{20} = 18.3735$ | | |
| $d_{20} = 5.94$ | $n_{d20} = 1.51533$ | $\nu_{d20} = 64.14$ |
| $r_{21} = -516.7792$ | | |
| $d_{21} = 0.28$ | $n_{d21} = 1$ | |
| $r_{22} = 38.9054$ | | |
| $d_{22} = 1.45$ | $n_{d22} = 1.741$ | $\nu_{d22} = 52.64$ |
| $r_{23} = 15.3846$ | | |
| $d_{23} = 9.44$ | $n_{d23} = 1.48749$ | $\nu_{d23} = 70.23$ |
| $r_{24} = -23.3077$ | | |
| $d_{24} = 0.20$ | $n_{d24} = 1$ | |
| $r_{25} = -278.1573$ | | |
| $d_{25} = 1.15$ | $n_{d25} = 1.8061$ | $\nu_{d25} = 40.92$ |
| $r_{26} = 17.639$ | | |
| $d_{26} = 7$ | $n_{d26} = 1.48749$ | $\nu_{d26} = 70.23$ |
| $r_{27} = -34.6815$ | | |
| $d_{27} = D_5$ | $n_{d27} = 1$ | |
| $r_{28} = \infty$ | | |
| $d_{28} = 0.7$ | $n_{d28} = 1.51633$ | $\nu_{d28} = 64.14$ |
| $r_{29} = \infty$ | | |
| $d_{29} = 0.4$ | $n_{d29} = 1$ | |
| $r_{30} = \infty$ | | |
| $d_{30} = 0.5$ | $n_{d30} = 1.542$ | $\nu_{d30} = 77.4$ |
| $r_{31} = \infty$ | | |
| $d_{31} = 2.8$ | $n_{d31} = 1.54771$ | $\nu_{d31} = 62.84$ |
| $r_{32} = \infty$ | | |
| $d_{32} = 0.5$ | $n_{d32} = 1$ | |
| $r_{33} = \infty$ | | |
| $d_{33} = 0.762$ | $n_{d33} = 1.5231$ | $\nu_{d33} = 54.49$ |
| $r_{34} = \infty$ | | |
| $d_{34}$ = 1.3189SZ | $n_{d34} = 1$ | |
| IMG = $\infty$ | | |

aspherical coefficients

| 11th surface | | |
|---|---|---|
| $K = 0$ | | |
| $A_2 = 0$ | $A_4 = -1.5917 \times 10^{-5}$ | $A_6 = -4.1799 \times 10^{-8}$ |
| $A_8 = -6.0084 \times 10^{-10}$ | $A_{10} = 9.0292 \times 10^{-12}$ | $A_{12} = -5.9555 \times 10^{-14}$ |

-continued

| 17th surface | | |
|---|---|---|
| $K = 0$ | | |
| $A_2 = 0$ | $A_4 = 2.2092 \times 10^{-5}$ | $A_6 = 6.9507 \times 10^{-8}$ |
| $A_8 = -5.0225 \times 10^{-10}$ | $A_{10} = 2.0146 \times 10^{-12}$ | $A_{12} = 2.2283 \times 10^{-15}$ |
| 21st surface | | |
| $K = 0$ | | |
| $A_2 = 0$ | $A_4 = 5.7666 \times 10^{-5}$ | $A_6 = 1.9404 \times 10^{-8}$ |
| $A_8 = 4.2423 \times 10^{-10}$ | $A_{10} = -5.5638 \times 10^{-12}$ | $A_{12} = 1.9633 \times 10^{-14}$ |

(variable space in focusing)

| | f = 14.69 | f = 28.1 | f = 53.09 |
|---|---|---|---|
| IO = ∞ (object distance (mm)) | | | |
| zooming space $D_1$ | 1 | 16.33 | 31.63 |
| $D_2$ | 7.94 | 3.7 | 1.46 |
| $D_3$ | 6.09 | 1.37 | 1. |
| $D_4$ | 10.45 | 6.44 | 1 |
| $D_5$ | 29.21 | 39.43 | 51.02 |
| IO = 229 (object distance (mm)) | | | |
| zooming space $D_1$ | 1.65 | 14.99 | 27.44 |
| $D_2$ | 4.59 | 1.63 | 1.09 |
| $D_3$ | 8.78 | 4.79 | 5.56 |
| $D_4$ | 10.45 | 6.44 | 1 |
| $D_5$ | 29.28 | 39.58 | 51.45 |

Fourth Embodiment

Figure 4A:
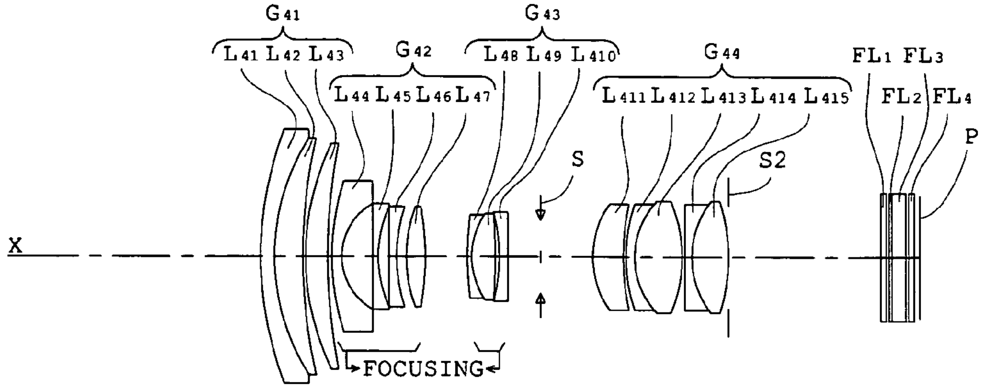
FIGS. 4A, 4B and 4C are sectional views taken along the optical axis that show the optical configuration of the zoom lens of the fourth embodiment according to the present invention, showing the states at the wide-angle end, the intermediate position, and the telephoto end, respectively.
Figure 4B:
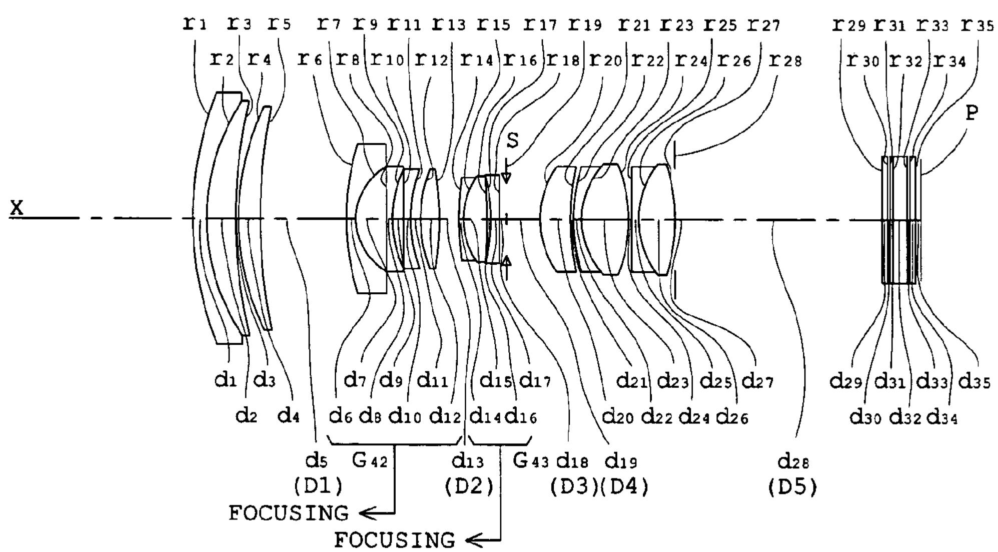
Figure 4C:
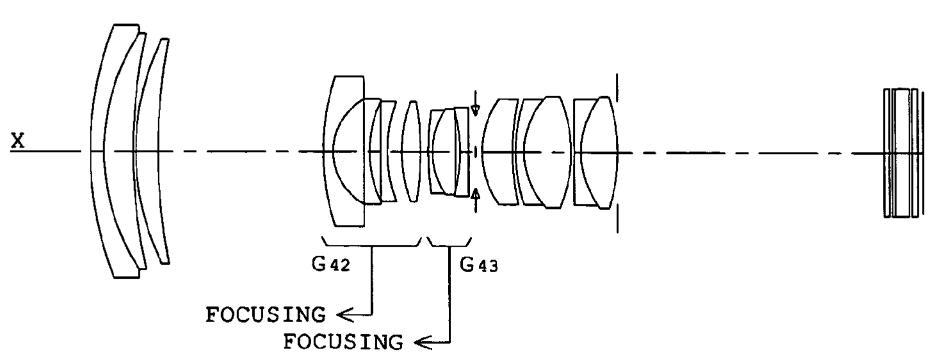
Figure 5A:
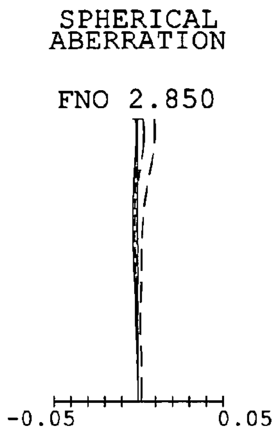
FIGS. 5A–5D, 5E–5H, and 5I–5L are diagrams that show spherical aberration, astigmatism, distortion, and chromatic aberration of magnification of the first embodiment at the wide-angle end, the intermediate position, and the telephoto end, respectively.
Figure 5B:
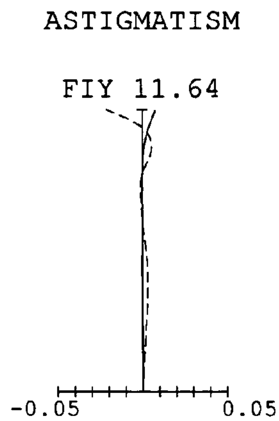
Figure 5C:
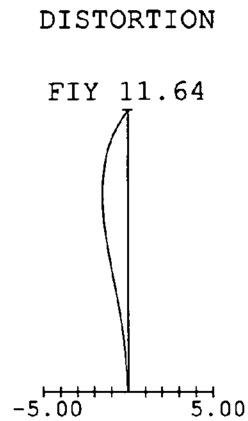
Figure 5D:
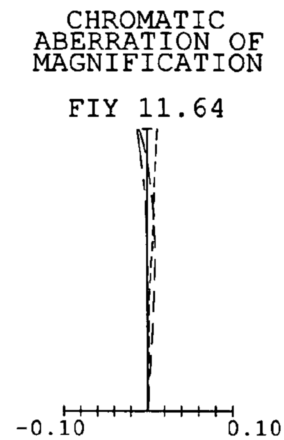
Figure 5E:
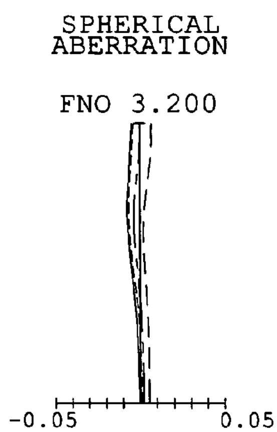
Figure 5F:
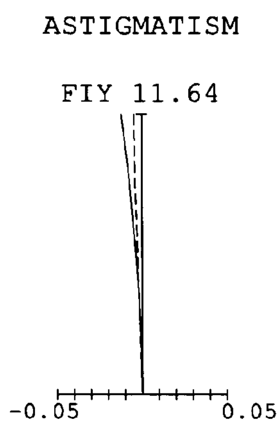
Figure 5G:
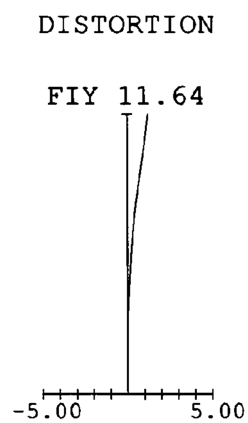
Figure 5H:
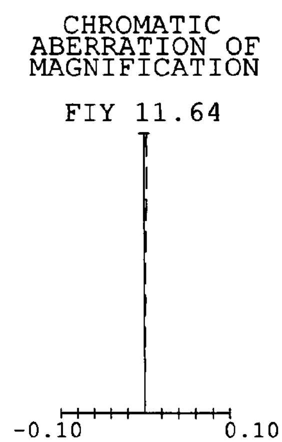
Figure 5I:
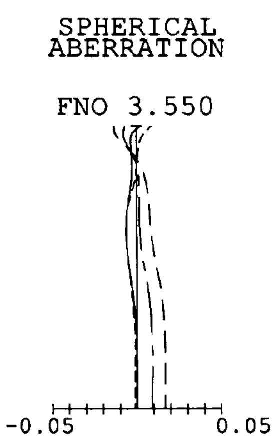
Figure 5J:
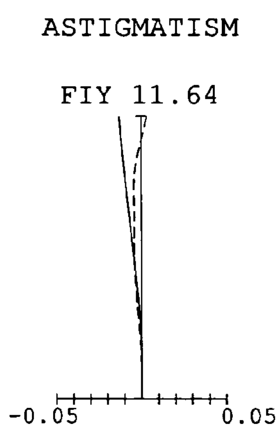
Figure 5K:
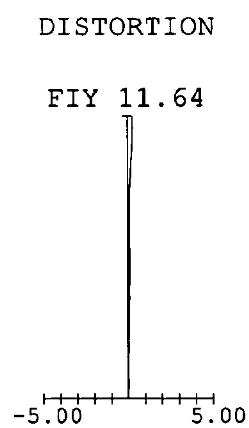
Figure 5L:
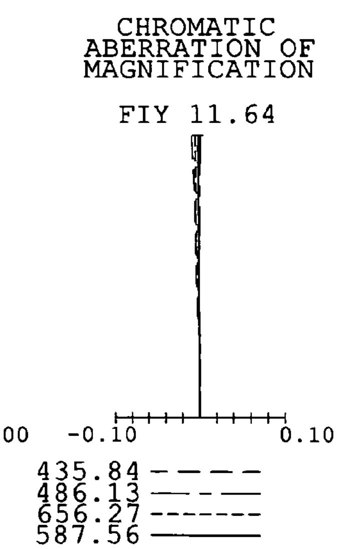
Figure 6A:
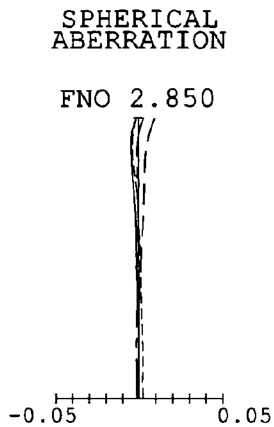
FIGS. 6A–6D, 6E–6H, and 6I–6L are diagrams that show spherical aberration, astigmatism, distortion, and chromatic aberration of magnification of the second embodiment at the wide-angle end, the intermediate position, and the telephoto end, respectively.
Figure 6B:
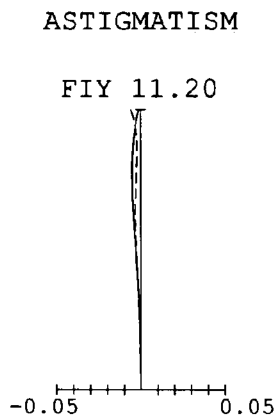
Figure 6C:
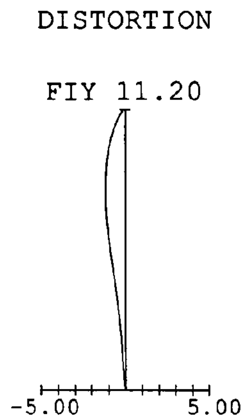
Figure 6D:
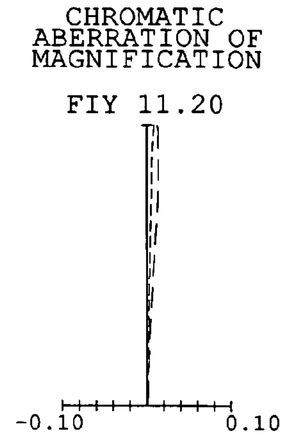
Figure 6E:
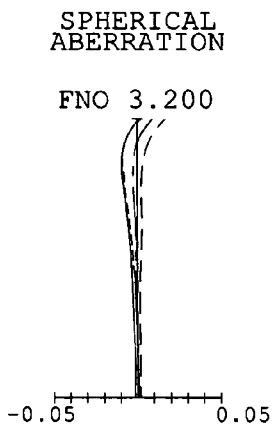
Figure 6F:
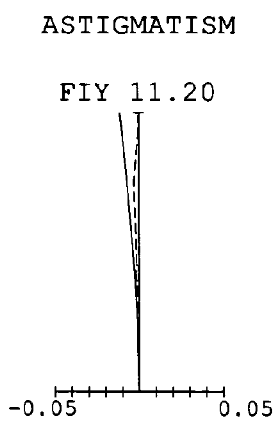
Figure 6G:
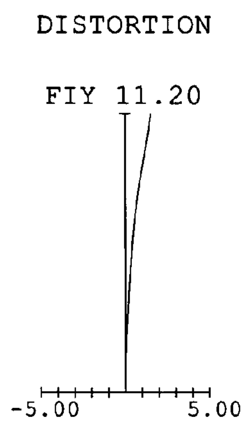
Figure 6H:
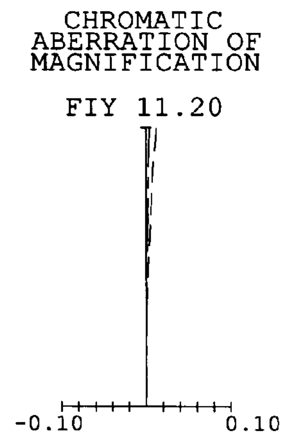
Figure 6I:
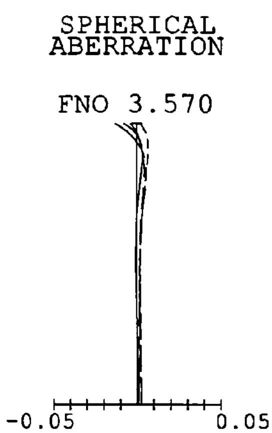
Figure 6J:
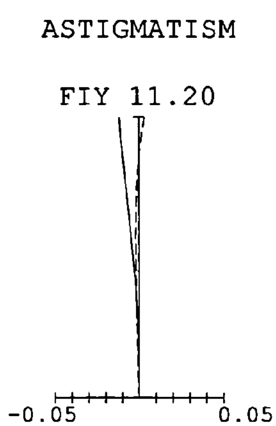
Figure 6K:
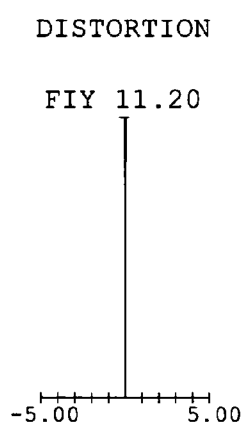
Figure 6L:
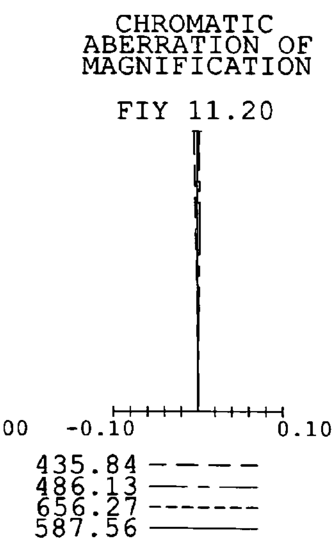
Figure 7A:
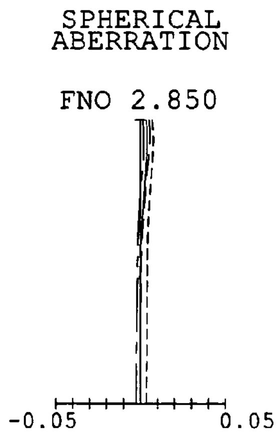
FIGS. 7A–7D, 7E–7H, and 7I–7L are diagrams that show spherical aberration, astigmatism, distortion, and chromatic aberration of magnification of the third embodiment at the wide-angle end, the intermediate position, and the telephoto end, respectively.
Figure 7B:
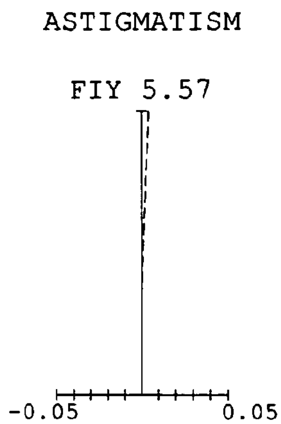
Figure 7C:
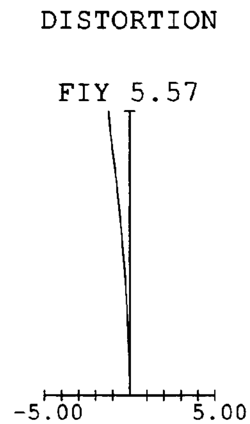
Figure 7D:
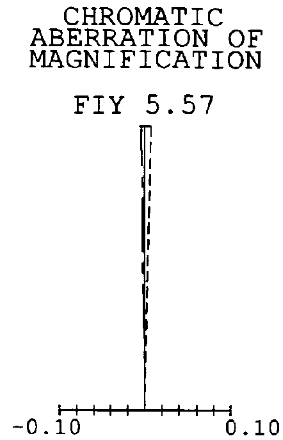
Figure 7E:
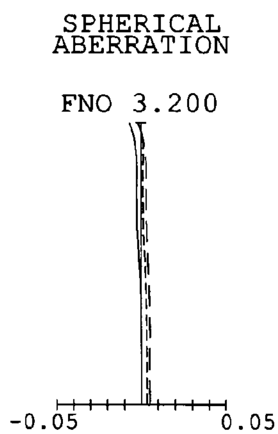
Figure 7F:
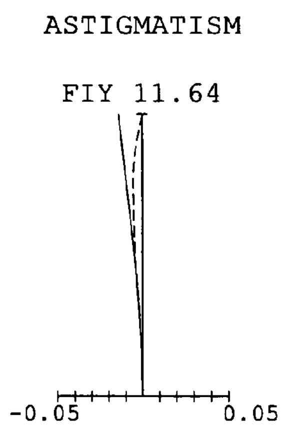
Figure 7G:
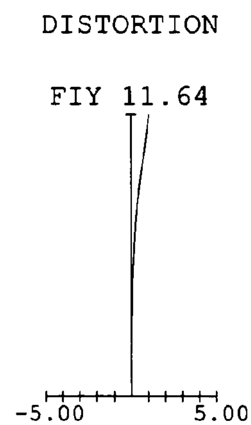
Figure 7H:
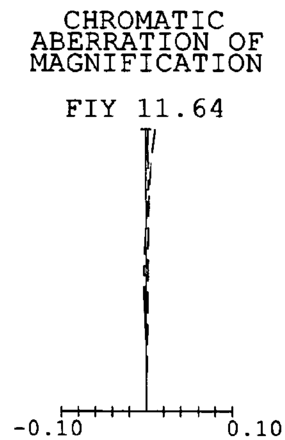
Figure 7I:
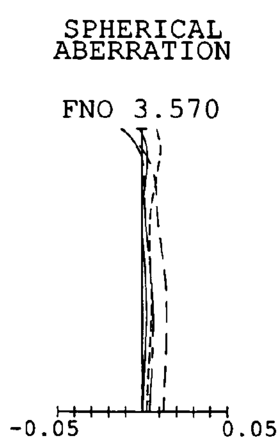
Figure 7J:
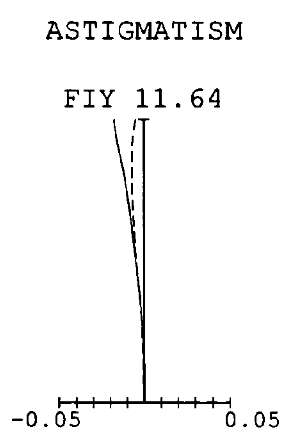
Figure 7K:
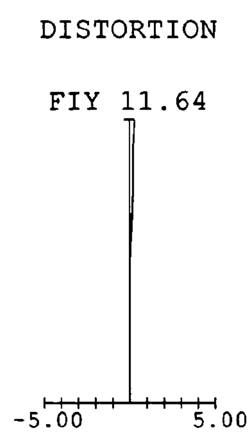
Figure 7L:
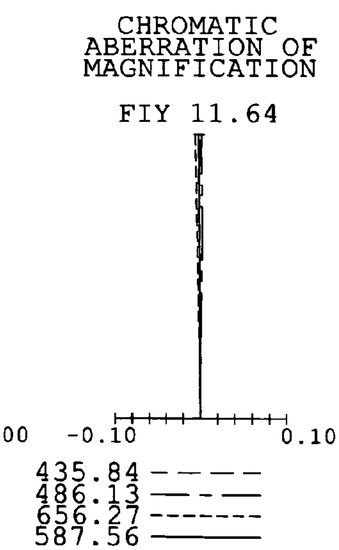
Figure 8A:
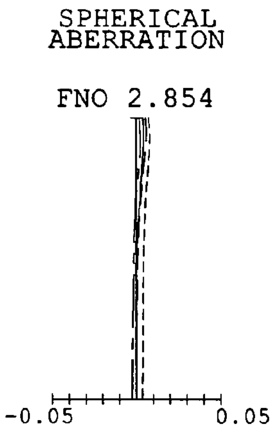
FIGS. 8A–8D, 8E–8H, and 8I–8L are diagrams that show spherical aberration, astigmatism, distortion, and chromatic aberration of magnification of the fourth embodiment at the wide-angle end, the intermediate position, and the telephoto end, respectively.
Figure 8B:
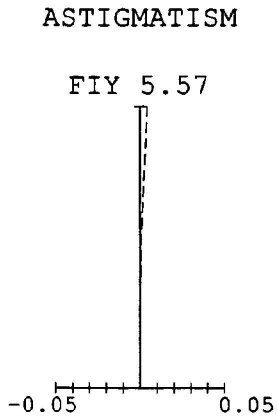
Figure 8C:
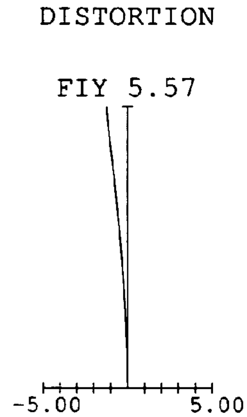
Figure 8D:
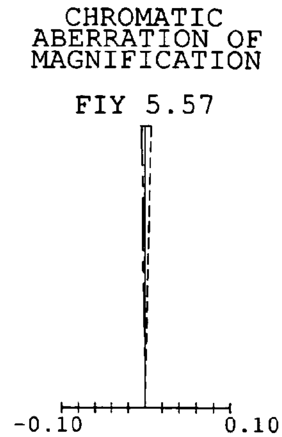
Figure 8E:
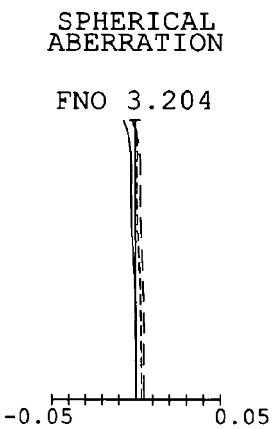
Figure 8F:
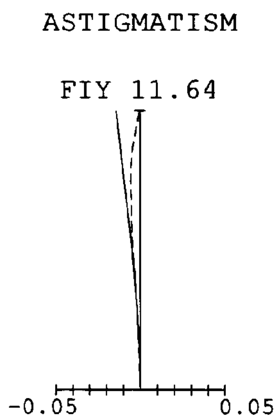
Figure 8G:
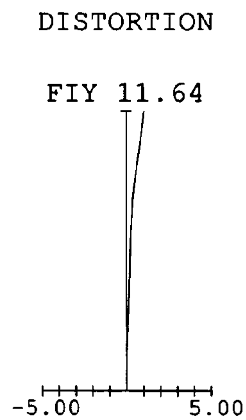
Figure 8H:
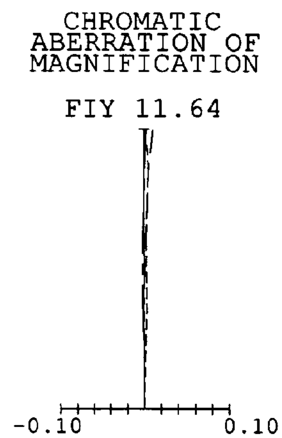
Figure 8I:
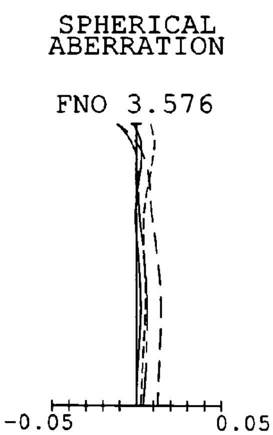
Figure 8J:
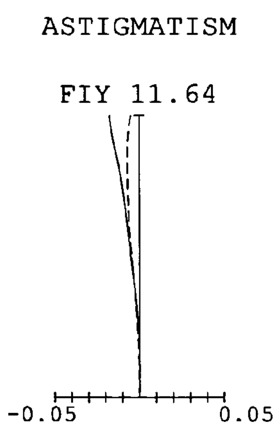
Figure 8K:
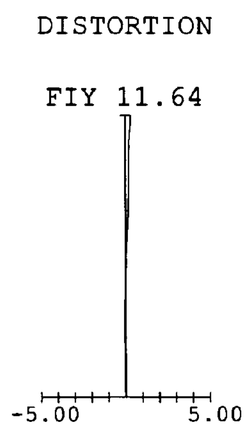
Figure 8L:
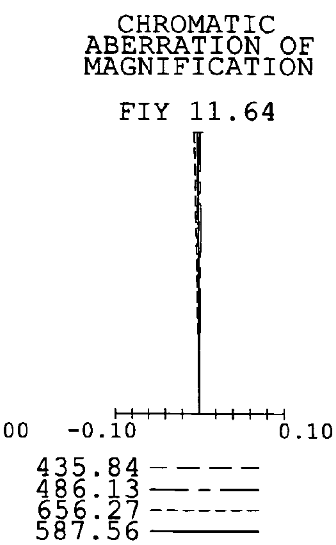

FIGS. 4A, 4B, and 4C are sectional views taken along the optical axis that show the optical configuration of the zoom lens of the fourth embodiment according to the present invention, showing the states at the wide-angle end, the intermediate position, and the telephoto end, respectively. FIGS. 8A–8D, 8E–8H, and 8I–8L are diagrams that show spherical aberration, astigmatism, distortion, and chromatic aberration of magnification of the third embodiment at the wide-angle end, the intermediate position, and the telephoto end, respectively.

As shown in FIG. 4, the zoom lens of the fourth embodiment includes, in order from the object side X toward an image-pickup element surface P, a first lens unit $G_{41}$ having a positive refractive power, a second lens unit $G_{42}$ having a negative refractive power, a third lens unit $G_{43}$ having a negative refractive power, and a fourth lens unit $G_{44}$ having a positive refractive power. During a magnification change from the wide-angle end (FIG. 4A) through the telephoto end (FIG. 4C), the first lens unit $G_{41}$ and the fourth lens unit $G_{44}$ are shifted from the image-surface side toward the object side. In this event, a space $D_1$ between the first lens unit $G_{41}$ and the second lens unit $G_{42}$ increases, and spaces $D_2$, $D_3$, $D_4$ (, and $D_5$) between individual lens units change. During a focusing from an object at the infinite distance onto an object at a near distance, the second lens unit $G_{42}$ and the third lens unit $G_{43}$ individually shift independently. In FIG. 4, the reference symbol S denotes a stop, the reference symbol $S_2$ denotes a flare cut stop, the reference symbol $FL_1$ denotes an infrared absorption filter, the reference symbol $FL_2$ denotes a filter, the reference symbol $FL_3$ denotes a lowpass filter, and the reference symbol $FL_4$ denotes a cover glass of a CCD or CMOS sensor. The reference symbol P denotes an image pickup surface, which is disposed in the effective image-pickup diagonal direction of the CCD or CMOS sensor.

The first lens unit $G_{41}$ is composed of, in order from the object side X, a negative first lens $L_{41}$, a positive second lens $L_{42}$, and a positive third lens $L_{43}$. The first lens $L_{41}$ and the second lens $L_{42}$ form a cemented lens.

The second lens unit $G_{42}$ is composed of, in order from the object side X, a negative fourth lens $L_{44}$, a negative fifth lens $L_{45}$, a negative sixth lens $L_{46}$, and a positive seventh lens $L_{47}$.

The third lens unit $G_{43}$ is composed of, in order from the object side X, a negative eighth lens $L_{48}$ with its object-side convex surface being aspherical, a positive ninth lens $L_{49}$, and a negative tenth lens $L_{410}$. The eighth lens $L_{48}$ and the ninth lens $L_{49}$ form a cemented lens.

The fourth lens unit $G_{44}$ is composed of, in order from the object side X, a positive eleventh lens $L_{411}$ with its object-side convex surface being aspherical, a negative twelfth lens $L_{412}$, a positive thirteenth lens $L_{413}$ with its object-side convex surface being aspherical, a negative fourteenth lens $L_{414}$, and a positive fifteenth lens $L_{415}$. Each pair of the twelfth lens $L_{412}$ and the thirteenth lens $L_{413}$, and the fourteenth lens $L_{414}$ and the fifteenth lens $L_{415}$ form a cemented lens. The stop S is arranged between the third lens unit $G_{43}$ and the fourth lens unit $G_{44}$. On the image side of the lens $L_{415}$ of the fourth lens unit $G_{44}$, arranged is the flare cut stop $S_2$ that is shaped substantially as a rectangle, followed by the infrared absorption filter $FL_1$, the filter $FL_2$, the lowpass filter $FL_3$, and the cover glass $FL_4$ arranged in this order toward the image pickup surface P. Also, the image pickup surface P is formed of a CCD or CMOS sensor.

This embodiment specifies a zoom lens having focal length of 14.6953.09 mm, F-number of 2.853.57, and 2ω=74.34°23.70°.

| Numerical data 4 | | |
|---|---|---|
| focal length f = 14.69~53.09 mm, Fno. = 2.85~3.57 | | |
| 2ω = 74.34°~23.70° | | |
| $r_{1} = 72.48$ | | |
| $d_{1} = 2.5$ | $n_{d1} = 1.78472$ | $\nu_{d1} = 25.68$ |
| $r_{2} = 43.70$ | | |
| $d_{2} = 5.84$ | $n_{d2} = 1.60311$ | $\nu_{d2} = 60.64$ |
| $r_{3} = 120.29$ | | |
| $d_{3} = 0.15$ | $n_{d3} = 1$ | |
| $r_{4} = 50.87$ | | |
| $d_{4} = 4.15$ | $n_{d4} = 1.7725$ | $\nu_{d4} = 49.6$ |
| $r_{5} = 116.57$ | | |
| $d_{5} = D_{1}$ | $n_{d5} = 1$ | |
| $r_{6} = 48.06$ | | |
| $d_{6} = 1.79$ | $n_{d6} = 1.7725$ | $\nu_{d6} = 49.6$ |
| $r_{7} = 11.99$ | | |
| $d_{7} = 5.96$ | $n_{d7} = 1$ | |
| $r_{8} = 402.03$ | | |
| $d_{8} = 1.3$ | $n_{d8} = 1.72916$ | $\nu_{d8} = 54.68$ |
| $r_{9} = 22.39$ | | |
| $d_{9} = 2.08$ | $n_{d9} = 1$ | |
| $r_{10} = 499.9999$ | | |
| $d_{10} = 1.5$ | $n_{d10} = 1.58213$ | $\nu_{d10} = 59.38$ |
| $r_{11} = 31.4025$ | | |
| $d_{11} = 1.87$ | $n_{d11} = 1$ | |
| $r_{12} = 32.59$ | | |
| $d_{12} = 3.64$ | $n_{d12} = 1.84666$ | $\nu_{d12} = 23.78$ |
| $r_{13} = -56.55$ | | |
| $d_{13} = D_{2}$ | $n_{d13} = 1$ | |
| $r_{14} = 97.86$ | | |
| $d_{14} = 1.01$ | $n_{d14} = 1.68893$ | $\nu_{d14} = 31.07$ |
| $r_{15} = 14.96$ | | |
| $d_{15} = 4.48$ | $n_{d15} = 1.51742$ | $\nu_{d15} = 52.43$ |
| $r_{16} = -77.80$ | | |
| $d_{16} = 0.71$ | $n_{d16} = 1$ | |

-continued

| Numerical data 4 | | |
|---|---|---|
| $r_{17} = -27.5251$ | | |
| $d_{17} = 1.4$ | $n_{d17} = 1.58213$ | $\nu_{d17} = 59.38$ |
| $r_{18} = -499.9997$ | | |
| $d_{18} = D_{3}$ | $n_{d18} = 1$ | |
| $r_{19}$ = (aperture stop) | | |
| $d_{19} = D_{4}$ | $n_{d19} = 1$ | |
| $r_{20} = 18.3735$ | | |
| $d_{20} = 5.94$ | $n_{d20} = 1.51533$ | $\nu_{d20} = 64.14$ |
| $r_{21} = -516.7792$ | | |
| $d_{21} = 0.28$ | $n_{d21} = 1$ | |
| $r_{22} = 38.91$ | | |
| $d_{22} = 1.45$ | $n_{d22} = 1.741$ | $\nu_{d22} = 52.64$ |
| $r_{23} = 15.38$ | | |
| $d_{23} = 9.44$ | $n_{d23} = 1.48749$ | $\nu_{d23} = 70.23$ |
| $r_{24} = -23.31$ | | |
| $d_{24} = 0.20$ | $n_{d24} = 1$ | |
| $r_{25} = -278.16$ | | |
| $d_{25} = 1.15$ | $n_{d25} = 1.8061$ | $\nu_{d25} = 40.92$ |
| $r_{26} = 17.64$ | | |
| $d_{26} = 7$ | $n_{d26} = 1.48749$ | $\nu_{d26} = 70.23$ |
| $r_{27} = -34.68$ | | |
| $d_{27} = 0.14$ | $n_{d27} = 1$ | |
| $r_{28} = \infty$ | | |
| $d_{28} = D_{5}$ | $n_{d28} = 1$ | |
| $r_{29} = \infty$ | | |
| $d_{29} = 0.7$ | $n_{d29} = 1.516331$ | $\nu_{d29} = 64.14$ |
| $r_{30} = \infty$ | | |
| $d_{30} = 0.4$ | $n_{d30} = 1$ | |
| $r_{31} = \infty$ | | |
| $d_{31} = 0.5$ | $n_{d31} = 1.542$ | $\nu_{d31} = 77.4$ |
| $r_{32} = \infty$ | | |
| $d_{32} = 2.8$ | $n_{d32} = 1.54771$ | $\nu_{d32} = 62.84$ |
| $r_{33} = \infty$ | | |
| $d_{33} = 0.5$ | $n_{d33} = 1$ | |
| $r_{34} = \infty$ | | |
| $d_{34} = 0.762$ | $n_{d34} = 1.5231$ | $\nu_{d34} = 54.49$ |
| $r_{35} = \infty$ | | |
| $d_{35} = 1.18$ | $n_{d35} = 1$ | |
| IMG = ∞ | | |

aspherical coefficients

| | | |
|---|---|---|
| | 14th surface | |
| K = 0 | | |
| $A_{2} = 0$ | $A_{4} = -1.5917 \times 10^{-5}$ | $A_{6} = -4.1799 \times 10^{-8}$ |
| $A_{8} = -6.0084 \times 10^{-10}$ | $A_{10} = 9.0292 \times 10^{-12}$ | $A_{12} = -5.9555 \times 10^{-14}$ |
| | 20th surface | |
| K = 0 | | |
| $A_{2} = 0$ | $A_{4} = 2.2092 \times 10^{-5}$ | $A_{6} = 6.9507 \times 10^{-8}$ |
| $A_{8} = -5.0225 \times 10^{-10}$ | $A_{10} = 2.0146 \times 10^{-12}$ | $A_{12} = 2.2283 \times 10^{-15}$ |
| | 24th surface | |
| K = 0 | | |
| $A_{2} = 0$ | $A_{4} = 5.7666 \times 10^{-5}$ | $A_{6} = 1.9404 \times 10^{-8}$ |
| $A_{8} = 4.2423 \times 10^{-10}$ | $A_{10} = -5.5638 \times 10^{-12}$ | $A_{12} = 1.9633 \times 10^{-14}$ |

(variable space in focusing)

| | f = 14.69 | f = 28.1 | f = 53.09 |
|---|---|---|---|
| | IO = ∞ (object distance (mm)) | | |
| zooming space $D_{1}$ | 1 | 16.33 | 31.63 |
| $D_{2}$ | 7.94 | 3.7 | 1.46 |
| $D_{3}$ | 6.09 | 1.37 | 1. |
| $D_{4}$ | 10.45 | 6.44 | 1 |
| $D_{5}$ | 29.21 | 39.43 | 51.02 |

-continued

| | f = 14.69 | f = 28.1 | f = 53.09 |
|---|---|---|---|
| IO = 235 (object distance (mm)) | | | |
| zooming space $D_1$ | 1.65 | 14.99 | 27.44 |
| $D_2$ | 4.59 | 1.628 | 1.09 |
| $D_3$ | 8.78 | 4.79 | 5.56 |
| $D_4$ | 10.45 | 6.44 | 1 |
| $D_5$ | 29.23 | 39.43 | 51.12 |

The above-described zoom lenses according to the present invention are applicable to silver-halide or digital, single-lens reflex cameras. An application example of these is shown below.

Figure 9:
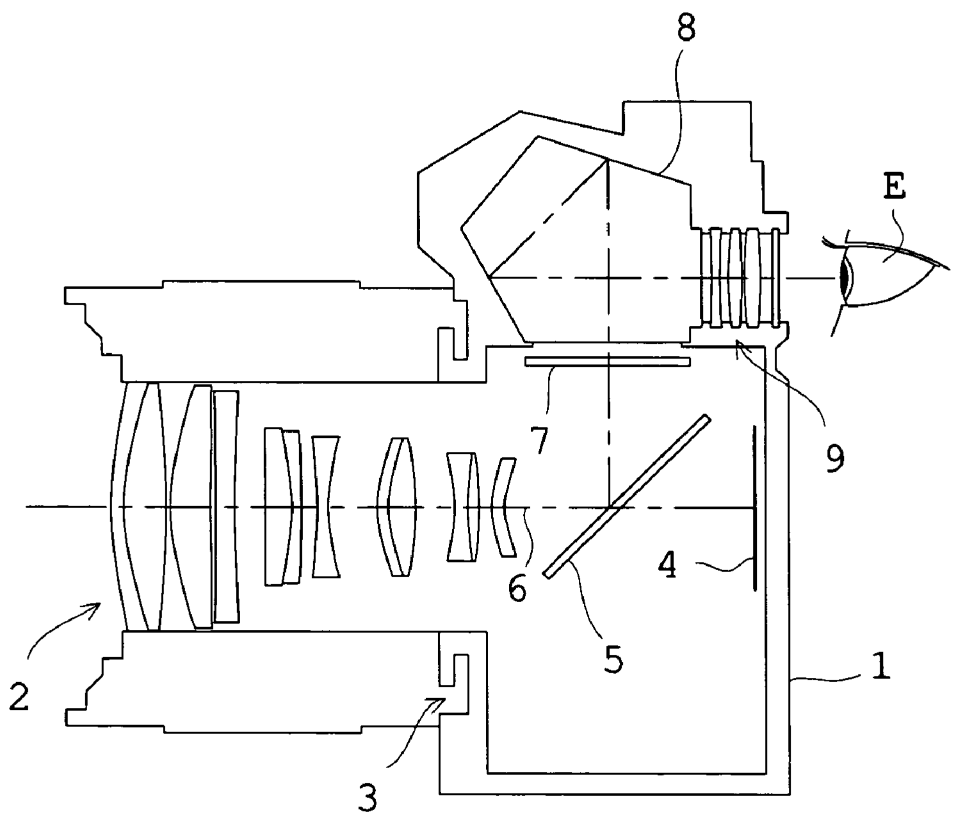
FIG. 9 is a configuration diagram of a single-lens reflex camera in which the zoom lens according to the present invention is used as a photographing lens.

FIG. 9 shows a single-lens reflex camera using a zoom lens of the present invention as the photographing lens and a compact CCD or C-MOS as the image-pickup element. In FIG. 9, the reference numeral 1 denotes a single-lens reflex camera, the reference numeral 2 denotes a photographing lens, the reference numeral 3 denotes a mount section, which achieves removable mount of the photographing lens 2 on the single-lens reflex camera 1. A screw type mount, a bayonet type mount and the like are applicable. In this example, a bayonet type mount is used. The reference numeral 4 denotes an image pickup surface of the image pickup element, the reference numeral 5 denotes a quick return mirror arranged between the lens system on the path of rays 6 of the photographing lens 2 and the image pickup surface 4, the reference numeral 7 denotes a finder screen disposed in a path of rays reflected from the quick return mirror, the reference numeral 8 denotes a penta prism, the reference numeral 9 denotes a finder, and the reference symbol E denotes an eye of an observer (eyepoint). A zoom lens of the present invention is used as the photographing lens 2 of the single-lens reflex camera 1 thus configured.

What is claimed is:

1. A zoom lens comprising, in order from an object side:

a first lens unit having a positive refractive power;

a second lens unit having a negative refractive power;

a third lens unit having a negative refractive power; and a fourth lens unit having a positive refractive power, wherein, during a magnification change from a wide-angle end through a telephoto end, the first lens unit and the fourth lens unit shift from an image-surface side toward an object side, a space between the first lens unit and the second lens unit increases, and spaces between individual lens units change, and wherein, during a focusing from an object at an infinite distance onto an object at a near distance, at least the second lens unit and the third lens unit individually shift independently.

2. A zoom lens according to claim 1, wherein an amount of shift of each of the second lens unit and the third lens unit for a focusing from an object at the infinite distance onto an object at any finite distance between the infinite distance and a proximate distance has a predetermined value differing by zooming position.

3. A zoom lens according to claim 1, satisfying the following condition:

$$-2<X_{2W}/X_{3W}<0.5$$

where $X_{2W}$ is an amount of shift of the second lens unit for a focusing from the infinite distance onto a proximate distance at the wide-angle end, and $X_{3W}$ is an amount of shift of the third lens unit for the focusing from the infinite distance onto the proximate distance at the wide-angle end, upon a shift toward the image-surface side being given a positive value.

4. A zoom lens according to claim 3, satisfying the following condition:

$$-1<X_{2W}/X_{3W}<0.3.$$

5. A zoom lens according to claim 3, satisfying the following condition:

$$-0.8<X_{2W}/X_{3W}<-0.01.$$

6. A zoom lens according to claim 1 or 2, wherein, during a focusing from an object at the infinite distance onto an object at a finite distance, the second lens unit shifts toward the image-surface side at the wide-angle end and shifts toward the object side at the telephoto end, and the third lens unit shifts toward the object side irrespective of zooming state.

7. A zoom lens according to claim 6, wherein an amount of shift of the second lens unit for a focusing from an object at the infinite distance onto an object at a particular finite distance continuously changes as a zooming state changes from the wide-angle end through the telephoto end.

8. A zoom lens according to claim 6, wherein an amount of shift of the third lens unit for a focusing from an object at the infinite distance onto an object at a particular finite distance continuously changes as a zooming state changes from the wide-angle end through the telephoto end.

9. A zoom lens according to claim 8, wherein, during the focusing from the object at the infinite distance onto the object at the particular finite distance, the third lens unit shifts towards the object side, with an amount of shift thereof increasing as a zooming state changes from the wide-angle end through the telephoto end.

10. A zoom lens according to claim 1 or 2, satisfying the following condition:

$$0.001<D_{12W}/D_{12T}<0.1$$

where $D_{12W}$ is a space between the first lens unit and the second lens unit at the wide-angle end under a condition where the infinite distance is in focus, and $D_{12T}$ is a space between the first lens unit and the second lens unit at the telephoto end under the condition where the infinite distance is in focus.

11. A zoom lens according to claim 10, satisfying the following condition:

$$0.005<D_{12W}/D_{12T}<0.07.$$

12. A zoom lens according to claim 10, satisfying the following condition:

$$0.01<D_{12W}/D_{12T}<0.05.$$

13. A zoom lens according to claim 1 or 2, satisfying the following condition:

$$3.0<D_{23W}/D_{23T}<20.0$$

where $D_{23W}$ is a space between the second lens unit and the third lens unit at the wide-angle end under a condition where the infinite distance is in focus, and $D_{23T}$ is a space between the second lens unit and the third lens unit at the telephoto end under the condition where the infinite distance is in focus.

14. A zoom lens according to claim 13, satisfying the following condition:

$$4.0<D_{23W}/D_{23T}<10.0$$

15. A zoom lens according to claim 13, satisfying the following condition:

$$5.0<D_{23W}/D_{23T}<7.0$$

16. A zoom lens according to claim 13, satisfying the following condition:

$$0.7<X_{2T}/X_{3T}<1.5$$

where $X_{2T}$ is an amount of shift of the second lens unit for a focusing from the infinite distance onto a proximate distance at the telephoto end, and $X_{3T}$ is an amount of shift of the third lens unit for the focusing from the infinite distance onto the proximate distance at the telephoto end.

17. A zoom lens according to claim 16, satisfying the following condition:

$$0.7<X_{2T}/X_{3T}<1.3.$$

18. A zoom lens according to claim 16, satisfying the following condition:

$$0.9<X_{2T}/X_{3T}<1.1.$$

19. A zoom lens device comprising:

a zoom lens according to claim 1; and a lens mount section arranged on the image-surface side of the zoom lens, the lens mount section being connectable with a camera.

20. A zoom lens device comprising:

a zoom lens according to claim 2; and a lens mount section arranged on the image-surface side of the zoom lens, the lens mount section being connectable with a camera.

21. A zoom lens device comprising:

a zoom lens according to claim 3; and a lens mount section arranged on the image-surface side of the zoom lens, the lens mount section being connectable with a camera.

* * * * *